3,120,562
PREPARATION OF α-HYDROXY-ε-AMINO-CAPROIC ACID

Johannes H. Ottenheym, Sittard, and Ulrich Verstrijden and Willem Pesch, Geleen, Netherlands, assignors to Stamicarbon N.V., Heerlen, Netherlands
No Drawing. Filed July 21, 1961, Ser. No. 125,665
Claims priority, application Netherlands July 28, 1960
2 Claims. (Cl. 260—534)

The present invention relates to the preparation of α-hydroxy-ε-aminocaproic acid from 2,3-dihydropyran-2-carboxaldehyde.

The 2,3-dihydropyran-2-carboxaldehyde used as the starting material for this preparation is a dimer of acrolein, which can be obtained from acrolein by a thermal treatment.

It is known that a salt of 2,3-dihydropyran-2-carboxylic acid is formed from 2,3-dihydropyran-2-carboxaldehyde by oxidation with oxygen in the presence of a silver catalyst and an amount of base which is sufficient to keep the pH at a value of at least 12.5. By acidification of the aqueous salt solution which is obtained and extraction with an ether, a mixture of 2,3-dihydropyran-2-carboxylic acid and the lactone of 6-hydroxy-tetrahydropyran-2-carboxylic acid is obtained after the extract has been distilled.

According to the present invention, it has been found that high yields of α-hydroxy-ε-aminocaproic acid can be obtained if 2,3-dihydropyran-2-carboxaldehyde, distributed (i.e. dissolved or suspended) in an excessive amount of water, is oxidized by means of an oxygen-containing gas, and the oxidation product is aminated in the resulting solution, by means of ammonia in the presence of hydrogen.

The exact reaction mechanisms of the present invention are not fully understood. However, it appears that the aldehyde group present in the molecule of the starting product is oxidized to a carboxylic acid group. Due to the presence of water, a hydroxy acid, i.e. the 6-hydroxy-tetrahydropyran-2-carboxylic acid is probably formed as an intermediate product. This acid is then apparently converted into an amino-acid by ammonia and hydrogen. This is accomplished by ring rupture as a result of which the α-hydroxy-ε-aminocaproic acid is obtained as the final product.

The oxidation can be carried out in a simple way by introducing a free oxygen-containing gas, for instance air, oxygen or a mixture of oxygen and air, into water in which 2,3-dihydropyran-2-carboxaldehyde is distributed by stirring. To promote the oxidation, known oxidation catalysts, such as silver oxide or finely divided silver, may be suspended in the water. The oxidation may be carried out at atmospheric pressure but higher pressures may also be used if desired. At the higher pressures, e.g. up to 100 atmospheres, the oxygen appears to react more readily so that the duration of the oxidation step may be shortened.

The oxidation may further be promoted by maintaining the reaction medium weakly alkaline, e.g. at a pH value of between 7.5–8.5. This may be accomplished by means of an appropriate base such as sodium hydroxide. To avoid the formation of undesired salts, it is recommended that the metal ions be removed after the oxidation has been stopped. This may be done by passing the aqueous solution obtained as the reaction product of the oxidation over an acid ion-exchanger.

According to a preferred way of carrying out the present process, the 2,3-dihydropyran-2-carboxaldehyde is first reacted with water before the oxidation is carried out. By acidifying the water, for instance with diluted sulphuric acid or the acid oxidation product, the aldehyde which is not soluble in water, is easily dissolved. In this dissolution step, 6-hydroxy-tetrahydropyran-2-carboxaldehyde is probably formed. Usually a pH of from 2 to 3 is sufficient for this step. The aqueous solution thus obtained is then subjected to the oxidation, preferably after the the pH has been raised to a value of about 8. This method of carrying out the invention has the advantage that the oxidation is carried out in a homogeneous liquid phase.

In the amination step, the oxidation product is made to react with ammonia in the solution obtained and in the presence of hydrogen. This amination and simultaneous reduction can be promoted by applying known hydrogenation catalysts, such as Raney catalysts.

The amination can be carried out in a simple way by introducing gaseous ammonia and hydrogen under simultaneous stirring into the solution in which a hydrogenation catalyst, for instance Raney nickel, has been suspended. The amination can be carried out at atmospheric pressure, but higher pressures may also be applied, as a result of which the reaction proceeds more readily.

After the amination the α-hydroxy-ε-aminocaproic acid can be recovered in conventional fashion from the resulting aqueous solution, for instance, by evaporating the solution to dryness. The acid thus obtained can be used for the manufacture of lysine.

In carrying out the present process, the ratio of starting material to water, on a weight basis, can be varied but will normally fall within the range of 50 to 100 parts of starting material for each 100 parts of water. The amount of oxygen utilized will also vary but, as a rule, from 10 to 100 mols of oxygen per mol of starting material will give the desired result. Usually this oxidation is carried out at 30 to 70° C. for from 50 to 150 minutes but other temperatures and times may also be used.

In the amination step, it is usually sufficient to use 10 to 100 mols ammonia for each mol of starting material. The amount of hydrogen utilized will usually be in the range of from 10 to 100 mols per mol of starting material. Generally, it is most convenient to use a gaseous mixture of ammonia and hydrogen. The temperature of this step can be caried but usually is between 15 and 50° C. over a period of 40 to 100 minutes.

The invention is further illustrated by the following working examples which are not intended to limit the scope of the invention.

Example I

In a stirring vessel 25 g. of silver dust is suspended in 150 g. of water. In the suspension 112 g. of 2,3-dihydropyran-2-carboxaldehyde is gradually distributed by stirring, while at the same time oxygen is introduced. The pH is kept at a value of 7.5–8 with the aid of sodium hydroxide. The temperature is kept at 40–45° C.

After one hour the aqueous solution obtained is separated from the silver catalyst by filtration and led over an acid ion-exchanger. Thereafter, 10 g. of Raney nickel is suspended in the solution, and a gas mixture consisting of ammonia and hydrogen is introduced into the suspension. The temperature is kept at 25–30° C., the pressure at 80–90 a.t.m. After 60 minutes, the reaction is stopped and the catalyst is removed by filtration. The aqueous solution obtained is then evaporated to dryness. The yield is 140 g. of α-hydroxy-ε-aminocaproic acid (efficiency appr. 95%), which is purified by recrystallization with the aid of aqueous ethanol. The melting point is 205° C.

Example II 112 g. of 2,3-dihydropyran-2-carboxaldehyde is dissolved in 20 g. of water to which 0.5 g. of dilute sulphuric acid (0.1 Normal) has been added. While the temperature increases to 45° C., a homogeneous solution is formed. The further procedure corresponds to that described in Example I to give the same results i.e., using the said solution obtained instead of the 112 grams of initial carboxaldehyde in Example I.

It will be appreciated that various modifications may be made in the invention described herein without deviating from the scope thereof as defined in the following claims wherein.

We claim:

1. A process for preparing α-hydroxy-ε-aminocaproic acid which comprises the steps of distributing from about 50 to 100 parts by weight of 2,3-dihydropyran-2-carboxaldehyde in about 100 parts by weight of water with stirring, said water having an acid pH lying within the range of 2 to 3, adjusting the pH of the resulting solution to an alkaline pH lying within the range of 7.5 to 8.5, subjecting the alkaline solution to oxidation at a temperature within the range of 30 to 70° C. in the presence of an oxidation catalyst with from 10 to about 100 mols of oxygen per mol of said 2,3-dihydropyran-2-carboxaldehyde, said oxygen being supplied in the form of an oxygen containing gas, and thereafter aminating the resulting oxidation product in the presence of a Raney catalyst, in solution, at a temperature within the range of 15 to 50° C., by treating the same with a gaseous mixture of from 10 to 100 mols of ammonia per mol of said 2,3-dihydropyran-2-carboxaldehyde, and from 10 to 100 mols of hydrogen per mol of said 2,3-dihydropyran-2-carboxaldehyde.

2. A process for preparing α-hydroxy-ε-aminocaproic acid which comprises the steps of distributing from about 50 to 100 parts by weight of 2,3-dihydropyran-2-carboxaldehyde in about 100 parts of water, subjecting the suspension to oxidation, while adjusting the pH to an alkaline pH lying within the range of 7.5 to 8.5, at a temperature within the range of 30 to 70° C. in the presence of an oxidation catalyst with from 10 to about 100 mols of oxygen per mol of said 2,3-dihydropyran-2-carboxaldehyde, said oxygen being supplied in the form of an oxygen containing gas, and thereafter aminating the resulting oxidation product in the presence of a Raney catalyst, in solution, at a temperature within the range of 15 to 50° C., by treating the same with a gaseous mixture of from 10 to 100 mols of ammonia per mol of said 2,3-dihydropyran-2-carboxaldehyde, and from 10 to 100 mols of hydrogen per mol of said 2,3-dihydropyran-2-carboxaldehyde.

References Cited in the file of this patent

UNITED STATES PATENTS 2,562,848     Whetstone    _____ July 31, 1951